United States Patent [19]
Kohler et al.

[11] Patent Number: 5,234,984
[45] Date of Patent: Aug. 10, 1993

[54] POLYPHENYLENE SULPHIDE MOULDING COMPOUNDS WITH IMPROVED ELECTRICAL PROPERTIES

[75] Inventors: Karl-Heinz Kohler; Wolfgang Wehnert; Klaus Kraft; Erhard Tresper, all of Krefeld, Fed. Rep. of Germany

[73] Assignee: Bayer Aktiengesellschaft, Leverkusen, Fed. Rep. of Germany

[21] Appl. No.: 556,833

[22] Filed: Jul. 23, 1990

Related U.S. Application Data

[63] Continuation of Ser. No. 445,123, Nov. 30, 1989, abandoned, which is a continuation of Ser. No. 232,233, Aug. 15, 1988, abandoned.

[30] Foreign Application Priority Data

Aug. 25, 1987 [DE] Fed. Rep. of Germany ... 3728301[U]

[51] Int. Cl.$^5$ ................................................ C08K 5/09
[52] U.S. Cl. .................................... 524/306; 524/318; 524/451; 524/609
[58] Field of Search ............... 524/277, 306, 318, 311, 524/451

[56] References Cited

U.S. PATENT DOCUMENTS

| | | | |
|---|---|---|---|
| 4,065,418 | 12/1977 | Foulks, Jr. et al. | 524/317 |
| 4,395,509 | 7/1983 | Blackwell et al. | 524/306 |
| 4,486,320 | 12/1984 | Sakurai et al. | 252/12.6 |
| 4,942,194 | 7/1990 | Bier et al. | 524/306 |

FOREIGN PATENT DOCUMENTS 0236835  8/1987  European Pat. Off. .
58-222145  12/1983  Japan ................... 524/277

OTHER PUBLICATIONS

Patent Abstracts of Japan, 7:167 (C-177) (1312) (1983).

Primary Examiner—John C. Bleutge
Assistant Examiner—Mark Sweet
Attorney, Agent, or Firm—Connolly & Hutz

[57] ABSTRACT

This invention relates to crystalline, thermoplastic moulding compounds of polyphenylene sulphide (PPS) and aliphatically saturated carboxylic acid esters. The moulding compounds have increased tracking resistance.

1 Claim, No Drawings

POLYPHENYLENE SULPHIDE MOULDING COMPOUNDS WITH IMPROVED ELECTRICAL PROPERTIES

This is a continuation of U.S. patent application Ser. No. 445,123 filed Nov. 30, 1989, abandoned, which in turn is a continuation of U.S. patent application Ser. No. 232,233 filed Aug. 15, 1988, abandoned.

This invention relates to crystalline, thermoplastic moulding compounds of polyphenylene sulphide (PPS) and aliphatically saturated carboxylic acid esters. The moulding compounds have increased tracking resistance.

Polyphenylene sulphides are valuable raw materials for the production of fibres, films and moulded articles on account of their advantageous thermal and mechanical properties and high chemical resistance. They are widely used in the electrical and electronics industry as they are flame-resistant and dimensionally stable and have a high temperature resistance in prolonged use and good electrical properties. Their tracking resistance, however, is less high than that, for example, of Polyamide 6, polyalkylene terephthalate or polystyrene. PPS is therefore only of limited use at high voltages.

It is known that the tracking resistance of polyarylene sulphides, for example, may be improved by the addition of calcium sulphate (EP-OS 87 145). The quantity of calcium sulphate required for this purpose, however, interferes with the mechanical properties of moulded articles produced from such modified PPS.

It is therefore an object of the present invention to improve the electrical properties, e.g. the tracking resistance, of polyphenylene sulphides optionally containing inorganic or organic fillers without at the same time impairing the advantageous mechanical and thermal properties of the polyphenylene sulphides and without affecting other properties which are important for working up the products, e.g. the melt flow and the colour stability.

It has now been found that polyphenylene sulphide has a substantially higher tracking resistance if it contains from 0.8 to 3% by weight of long chained aliphatic, saturated esters of long chained carboxylic acids, based on the quantity of polyphenylene sulphide and its esters. This modified PPS has improved mechanical properties and increased melt flow.

PPS which has been modified according to the invention is as clear in colour as the unmodified product. In contrast to a polyphenylene sulphide to which esters of low molecular weight have been added, the polyphenylene sulphide which has been modified according to the invention shows no signs of evaporation of the polyester used (see U.S. Pat. No. 4,413,083).

The present invention therefore relates to moulding compounds which can be processed thermoplastically, obtained from a) 27 to 99.92% by weight, preferably 29 to 99.9% by weight, based on the sum of a) + b), of a polyphenylene sulphide having a fusion viscosity of at least 2 to $10^7$ Pa.s (determined at 306° C. and a shear gradient of $10^3$ sec$^{-1}$) and b) 0.08 to 3% by weight, preferably 0.1 to 1% by weight, based on the sum of a) + b) + c), of one or more aliphatic, saturated esters of a long chained carboxylic acid and a long chained alcohol or a short chained polyalcohol, and optionally c) 0 to 70% by weight, based on the sum of a) + b) + c), of inorganic fillers and reinforcing materials.

PPS which has been modified according to the invention may be worked up into moulding compounds in the usual manner. Thus, for example, components a) and b) and optionally c) may be mixed together and homogenized, for example in the molten state in an extruder or kneader.

The polyphenylene sulphides used according to the invention are known (e.g. U.S. Pat. No. 3,354,129, EP-OS 171 021). Straight-chained polyphenylene sulphides having a fusion viscosity (306° C., $10^3$ sec$^{-1}$) of 5 to 1000 Pa.s, most preferably 20 to 700 Pa.s, are preferred.

According to the invention, esters of a long-chained carboxylic acid and a long-chained alcohol corresponding to formulae (I) and (II) may be used:

(I)

(II)

wherein
n stands for the number 2, 3 or 4,
R stands for $C_{22}$–$C_{36}$-alkyl,
$R^1$ stands for $C_{18}$–$C_{34}$-alkyl and
$R^2$ stands for $C_2$–$C_8$-alkylene or a group corresponding to formula (III)

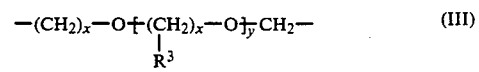

(III)

in which
x stands for the number 1, 2, 3 or 4,
y stands for an integer with a value from 2 to 20 and
$R^3$ stands for $C_1$–$C_4$-alkyl or hydrogen (H), and when
n stands for the number 3 in formula (II) then
$R^2$ stands for a $C_2$–$C_8$-alkine and when n in formula (II) stands for the number 4 then $R^2$ stands for —CH$_2$—C(CH$_3$)$_2$— (isopentylene).

The esters used according to the invention may be, for example, montan wax esters obtained from naturally occurring montan wax (e.g. "Kirk-Othmer, Encyclopedia of Chemical Technology", 3rd Edition, 1981, Volume 14, page 340 et seq. and Volume 24, page 471 et seq, and "Ullmann, Encyclopädie der technische Chemie", 4th Edition, 1983, Volume 24, pages 16 to 20).

Montan wax esters are esters obtained from predominantly even numbered $C_{22}$ to $C_{36}$-n-alkanoic acids and $C_{18}$ to $C_{34}$-n-alkanols (wax alkanols) in which the acid components and the alcohol components may be mixtures of their homologues.

The esters of formula (II) used according to the invention may be, for example, esters of montanic acids ($C_{22}$ to $C_{36}$ n-alkanoic acids) with aliphatic polyhydroxyl compounds, some of which are available commercially (e.g. Hoeschst-Wachs E$^{[R]}$) such as ethylene glycol, diethylene glycol and polyethylene glycol, propanediol-(1,2), propanediol-(1,3), butanediol-(1,4), hexanediol-(1,6), 2-ethylhexanediol-(1,3), glycerol, trimethylolpropane and pentaerythritol. They may be prepared, for example, by known methods of esterification of alcohols and acids (e.g. "Houben-Weyl, Methoden der organischen Chemie", 4th Edition, 1985, Volume E 5, pages 656 to 715).

The esters used according to the invention may be mixtures of compounds corresponding to formula (I) and formula (II). The esters are preferably esters of $C_{22}$ to $C_{36}$ n-alkanoic acids with polyhydric alcohols. The acid components are preferably mixtures of various alkanoic acids.

In addition to components a) and b), the moulding compounds according to the invention may contain the usual fillers and reinforcing materials c) such as glass fibres, carbon fibres, aramide fibres and fibrous inorganic minerals such as glass mats, etc.

Examples of fillers include mineral fillers such as powdered quartz, talc, chalk, mica, titanium dioxide, zinc sulphide, calcium sulphate, kaolin, etc. Glass fibres are preferred reinforcing materials and quartz, talc and kaolin are preferred fillers.

The moulding compounds according to the invention may also contain conventional processing auxiliaries and colouring agents.

The moulding compounds according to the invention are suitable for applications in the electrical and electronic filed in which high tracking resistance is required in addition to high temperature resistance and chemical resistance as well as flame-resistance. They are further distinguished by the ease with which they can be removed from the mould in injection moulding and by the good quality surfaces of the moulded parts.

EXAMPLES

Components used

A. Polyphenylene sulphide having a fusion viscosity of 55 Pa.s (determined at 306° C. at a shear gradient of 1000 sec$^{-1}$)

B. Ethylene glycol-bis-C-36 alkanoic esters

C. Sized 6 mm glass fibres having a fibre diameter of about 10 μm

D. Talc, particle diameter: 50%<3 μm.

Preparation of the moulding compounds

The moulding compounds according to the invention are prepared by mixing and homogenizing the components in the melt at a reaction temperature of about 300 to 320° C. in a two-shaft screw ZSK 32 (Werner and Pfleiderer). The dried extruded granulate was made up into standard test samples in conventional injection moulding machines and the samples were tested according to DIN and ASTM standards (see below).

TABLE

| Example | Components (% by weight) | | | | CTI (V) | $\sigma_{bB}$ (MPa) | $a_n$ (kJ/m$^2$) |
|---|---|---|---|---|---|---|---|
| | A | B | C | D | | | |
| Comparison | 40 | — | 30 | 30 | 150 | 188 | 15 |
| I | 39.75 | 0.25 | 30 | 30 | 200 | 193 | 17 |
| II | 39.50 | 0.50 | 30 | 30 | 225 (IEC 112) | 185 (DIN 53452) | 15 (ISO 180) |

We claim:

1. Polyphenylene sulphide moulding composition which comprises:
   a) 39.50 to 39.75% by weight, based on the sum of a), b), c) and d), of a polyphenylene sulphide having a fusion viscosity of about 55 Pa.s, determined at 306° C. at a shear gradient of 10$^3$ sec$^{-1}$,
   b) 0.25 to 0.5% by weight, based on the sum of a), b), c) and d), of ethylene glycol-bis-C-36 alkanoic esters,
   c) 30% by weight, based on the sum of a), b), c) and d), of glass fibres, and
   d) 30% by weight, based on the sum of a), b), c) and d) of talc.

* * * * *